Aug. 14, 1945.  H. C. CARLSON  2,381,876
PROCESS OF SEPARATING SULPHUR DIOXIDE AND CHLORINE BY DISTILLATION
Filed Aug. 21, 1941
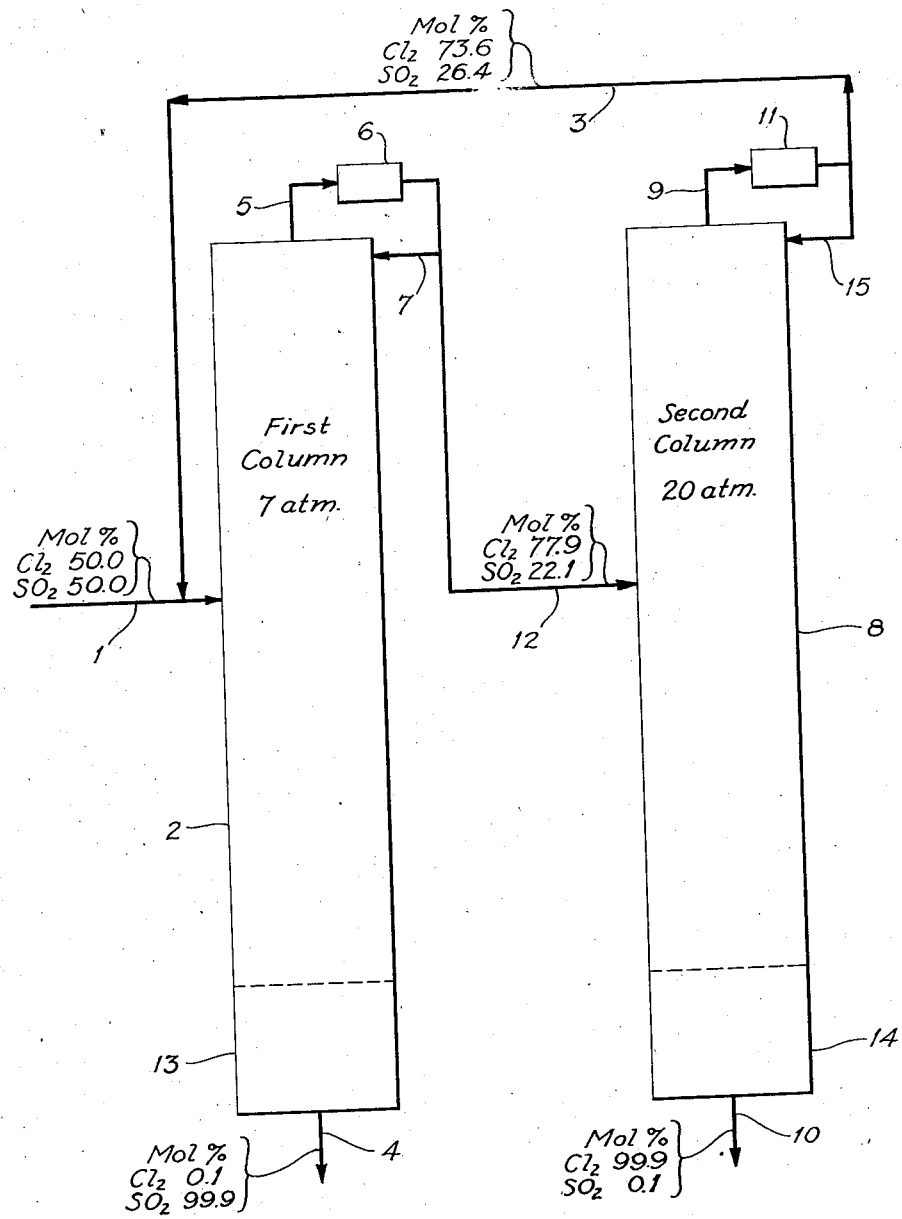
Harrison C. Carlson
INVENTOR
BY
ATTORNEY Patented Aug. 14, 1945

2,381,876

UNITED STATES PATENT OFFICE 2,381,876

PROCESS OF SEPARATING SULPHUR DIOXIDE AND CHLORINE BY DISTILLATION

Harrison C. Carlson, Wilmington, Del., assignor to E. I. du Pont de Nemours & Company, Wilmington, Del., a corporation of Delaware Application August 21, 1941, Serial No. 407,767

8 Claims. (Cl. 23—177)

This invention relates to the separation of chlorine and sulphur dioxide and more particularly to processes in which liquid mixtures of sulphur dioxide and chlorine are distilled; specifically, distilled at one pressure and the distillates distilled at another pressure, sulphur dioxide being obtained as a residue at the lower pressure and chlorine as a residue at the higher pressure.

Separating chlorine and sulphur dioxide from their mixtures with each other has long been a problem in the chemical art. For instance, common salt and sulphur trioxide react at temperatures above about 450° C. to give sodium sulphate and an equimolecular mixture of chlorine and sulphur dioxide gases, but although chlorine and sodium sulphate are much in demand, investigations of this reaction for producing them have heretofore found the reaction economically disadvantageous for lack of a satisfactory method of separating the chlorine and sulphur dioxide.

Chlorine and sulphur dioxide have physical and chemical characteristics which make difficult their separation by conventional methods. Common liquid absorbents such as aqueous alkali solutions absorb both of the gases and react with them. The gases are so highly reactive that few solvents are known with which they can be extracted in the liquid phase and such solvents as are known, for instance, chlorinated hydrocarbons, have about as much solvent action on one of the gases as on the other. The task of separation is further complicated by the fact that sulphur dioxide and chlorine react readily to form sulphuryl chloride in the presence of a catalyst and a wide variety of materials act as a catalyst for such reaction.

Liquefaction of gaseous mixtures of chlorine and sulphur dioxide provides no satisfactory method for effecting separation. When liquefied, chlorine and sulphur dioxide are miscible in all proportions, so that a gravimetric separation is impossible. Distillation of such liquefied mixtures by ordinary methods likewise offers no answer to the problem since it is found that upon distillation under the most favorable conditions the product first obtained is not the lower-boiling of the two components in the pure state (at atmospheric pressure the boiling point of chlorine is −33.5° C., and that of sulphur dioxide is −9.7° C.), but is, instead, a constant-boiling mixture, or azeotrope, boiling under atmospheric pressure at −34.7° C., and containing 12.5 mol per cent of sulphur dioxide.

It is an object of the present invention to provide processes for separating mixtures of chlorine and sulphur dioxide. Another object is to provide processes for producing chlorine and sulphur dioxide by fractional distillation of their liquefied mixtures under at least two different pressures. Another object is to provide processes for producing chlorine and sodium sulphate by the action of sulphur trioxide on salt. Further objects will appear hereinafter.

The foregoing and related objects of this invention are accomplished by processes in which liquid mixtures of chlorine and sulphur dioxide are distilled at one pressure and the distillates are distilled at another pressure, sulphur dioxide being recovered as a residue at the lower pressure and chlorine being recovered as a residue at the higher pressure.

The nature of this invention will be more readily understood by reference to the accompanying drawing in which Figure 1 is a flow diagram of a typical system for separation of chlorine and sulphur dioxide illustrating a preferred embodiment of the invention.

In the operation of a process of the invention a liquid mixture of chlorine and sulphur dioxide, preferably containing not substantially more than one mol of chlorine per mol of sulphur dioxide, is admitted through supply line 1 to a fractionating column 2. Through return line 3 a recycled fraction relatively rich in chlorine is also introduced into the fractionating column. In the fractionating column the liquid mixture is distilled, preferably continuously, at constant pressure and under such conditions of reflux and separating column effectiveness that the composition of the liquid leaving the reboiler 13 at the base of the column is substantially 100 per cent sulphur dioxide. The residue is removed through discharge line 4. The gases from fractionating column 2 pass off through gas exit 5 and are condensed to a liquid in condenser 6, a requisite portion of the condensate being refluxed to the fractionating column through line 7. The balance of the condensate, an azeotropic mixture rich in chlorine, is introduced into a second fractionating column 8 through feed line 12 at a pressure higher than that in the first fractionating column by means of a pump, not shown. In the second fractionating column the first azeotrope is distilled at a constant pressure, a second azeotrope less rich in chlorine being conducted off thru gas exit 9, the liquid from the reboiler 14 in this case comprising substantially pure chlorine which is removed through discharge line 10. The second azeotrope is condensed to a liquid in condenser 11, a portion of the condensate being refluxed to the fractionating column through line 15 and the balance being recycled to the inlet side of the first fractionating tower through return line 3.

The invention is clearly illustrated by the following specific example which is not to be construed as limiting.

Example

Using a system such as illustrated in Figure 1, there is fed to the first fractionating column an equimolar mixture of liquid sulphur dioxide and liquid chlorine together with a portion of a recycled liquid azeotropic mixture containing 73.6 mol per cent of chlorine and 26.4 mol per cent of sulphur dioxide. These feed liquids are used in the proportion of 190.4 tons per unit time of the fresh equimolar mixture to 499.0 tons of recycled azeotrope. The heat supplied to the reboiler and the water supplied to the condenser are so regulated that the pressure in the column is maintained at 7 atmospheres absolute. The temperature at the head of the first fractionating column is maintained at about 18° C. and the rate of feed and reflux are so governed that a residue comprising a liquid mixture containing 99.9 mol per cent of sulphur dioxide and 0.1 mol per cent of chlorine is continuously withdrawn from the base of the column, and at the head of the column an azeotropic mixture is condensed and in part returned as reflux having a composition of 77.9 mol per cent of chlorine and 22.1 mol per cent of sulphur dioxide. The residue is obtained in the proportion of 90.4 tons and the azeotropic mixture withdrawn in the proportion of 599.0 tons per unit time.

The azeotropic distillate from the first fractionating column is pumped to a second fractionating column operating at a pressure of 20 atmospheres absolute. The temperature at the top of this column is maintained at about 57.5° C., and the rate of feed and reflux ratio are so governed that there is withdrawn as a residue from the reboiler at the bottom of the column a liquid containing 99.9 mol per cent of chlorine and 0.1 mol per cent of sulphur dioxide, while from the condenser at the top of the column there is obtained an azeotrope containing 73.6 mol per cent of chlorine and 26.4 mol per cent of sulphur dioxide, this composition being maintained by refluxing a suitable amount of distillate. The residue from the second fractionating column is in the proportion of 100 tons and the azeotropic mixture is in the proportion of 499.0 tons. This azeotrope is recirculated to the inlet side of the first fractionating column for further separation.

It is seen that according to the example fractions containing substantially pure chlorine and substantially pure sulphur dioxide are obtained according to a process of this invention.

In a further aspect of the invention the chlorine-sulphur dioxide separation processes already described may be employed in combination with the reaction of sulphur trioxide on common salt at temperatures above about 450° C. In such processes the equimolar mixture of chlorine and sulphur dioxide fed to the first fractionating column is obtained by the reaction of sulphur trioxide on common salt and the sulphur dioxide obtained from the bottom of the first fractionating column is oxidized to sulphur trioxide and recycled for reaction on further quantities of salt. The process thus becomes a unitary, economically well balanced system, the overall result of its operation being to produce salt cake and chlorine.

The conditions of operation and the apparatus shown in the example are given merely by way of illustration and are susceptible to considerable variation and modification. Those skilled in the art may readily conceive numerous alternative procedures and devices whereby to secure the effect of the invention.

Obviously, the processes of this invention may be operated either continuously or batch-wise. From the standpoint of economy, however, the continuous operation is much to be preferred, the first and second distillations being so adjusted to each other that each is able to take care of the distillate from the other in a continuous cycle.

The pressures employed in the first and second fractionating columns may be widely varied. Preferably, the pressures will be so selected that the differential between them is as large as possible. The pressure in one column will therefore preferably be as low as possible and the pressure in the other column as high as possible, the actual pressures selected being governed primarily by economic and mechanical considerations. In the high-pressure column the temperature must, of course, be such that a pressure below the critical pressure of the gas present can be employed. The greater is the difference between the operating pressures of the first and second fractionating columns, the less is the fraction of the initial feed which must ultimately be recirculated, and consequently the greater is the production from equipment of a given size. Operating pressures of about 7 atmospheres in one column and 20 atmospheres in the other column, as shown in the foregoing example, are particularly preferable since the pressure differential permits an excellent separation of chlorine and sulphur dioxide with a reasonable amount of recirculated azeotrope from the second tower. Moreover, construction of equipment to operate at 20 atmospheres may be along lines with which the art is already familiar, pressures which are substantially higher requiring relatively expensive construction. On the other hand, operation of one of the fractionating columns at 7 atmospheres pressure, although it involves the use of pressure equipment, is more economical than atmospheric operation, an apparent alternative, since atmospheric operation would require maintaining the temperature of the condenser at about −35° C., thus entailing expensive refrigeration.

The operation of a process of this invention is not limited to the production of substantially pure sulphur dioxide and chlorine, but on the contrary, may be applied to producing mixtures of these two materials which are relatively richer in one component than in the other. Thus, for uses where more than traces of sulphur dioxide can be tolerated, it may be economically expedient to produce mixtures containing, say, 95 per cent chlorine and 5 per cent sulphur dioxide. A variety of other applications will be readily apparent to those skilled in the art.

While in the foregoing description there have been shown certain specific processes, it will be understood that one skilled in the art without departing from the spirit of the invention may readily employ various processes in which mixtures of sulphur dioxide and chlorine are distilled at one pressure and the distillate is distilled at another pressure.

I claim:

1. In a process for separating chlorine and sulphur dioxide, the steps comprising distilling fractionally at one pressure a mixture comprising chlorine and sulphur dioxide, whereby a residue rich in one of these components is obtained and an azeotropic mixture containing both components is formed as a distillate, and fractionally distilling this distillate at another pressure whereby a residue rich in the other component is obtained and a distillate of another azeotropic mixture is formed.

2. In a process for separating chlorine and sulphur dioxide, the steps comprising distilling fractionally at one pressure a mixture comprising chlorine and sulphur dioxide, whereby a residue rich in one of these components is obtained and an azeotropic mixture containing both components is formed as a distillate, fractionally distilling this distillate at another pressure whereby a residue rich in the other component is obtained and a distillate of another azeotropic mixture is formed, and recycling the second azeotropic mixture for distillation at the first pressure.

3. In a process for separating chlorine and sulphur dioxide, the steps comprising distilling fractionally at one pressure a mixture comprising chlorine and sulphur dioxide, whereby a residue rich in sulphur dioxide and an azeotropic mixture of sulphur dioxide and chlorine is obtained as a distillate, and distilling this distillate fractionally at a higher pressure whereby a residue relatively rich in chlorine and a distillate of another azeotropic mixture are obtained.

4. In a process for separating chlorine and sulphur dioxide, the steps comprising distilling fractionally at one pressure a mixture comprising chlorine and sulphur dioxide, whereby a residue rich in sulphur dioxide and an azeotropic mixture of sulphur dioxide and chlorine is obtained as a distillate, distilling this distillate fractionally at a higher pressure whereby a residue relatively rich in chlorine and a distillate of another azeotropic mixture are obtained, and recycling the second azeotropic mixture for distillation at the first pressure.

5. In a process for separating chlorine and sulphur dioxide from a mixture containing approximately equimolar proportions of each, the steps comprising distilling the mixture fractionally at about 7 atmospheres absolute pressure, whereby a residue rich in sulphur dioxide and a distillate of azeotropic mixture are obtained, and distilling the azeotropic mixture under about 20 atmospheres absolute pressure whereby a residue rich in chlorine and a distillate of a second azeotropic mixture of chlorine and sulphur dioxide are obtained.

6. In a process for separating chlorine and sulphur dioxide from a mixture containing approximately equimolar proportions of each, the steps comprising fractionally distilling the mixture at about 7 atmospheres absolute pressure, whereby a residue rich in sulphur dioxide and a distillate of azeotropic mixture are obtained, distilling the azeotropic mixture under about 20 atmospheres absolute pressure whereby a residue rich in chlorine and a distillate of a second azeotropic mixture of chlorine and sulphur dioxide are obtained, and recycling the second azeotropic mixture to the first distillation in the proportion of about 5 parts of azeotrope per part by weight of fresh equimolar mixture.

7. In a process for the production of chlorine and salt cake, the steps comprising treating common salt with sulphur trioxide at a temperature in excess of 450° C. whereby salt cake and an equimolar mixture of sulphur dioxide and chlorine are formed, liquefying the mixture, separating the sulphur dioxide and chlorine by fractionally distilling the liquid at one pressure to obtain a residue rich in sulphur dioxide and a distillate of azeotropic mixture of chlorine and sulphur dioxide and then distilling this distillate fractionally at a higher pressure to obtain a residue rich in chlorine and a second azeotropic distillate and returning this second distillate to the first distillation, the sulphur dioxide thus formed being oxidized to sulphur trioxide and returned to the initial step in the process for reaction upon additional salt.

8. In a process for the production of chlorine and salt cake, the steps comprising treating common salt with sulphur trioxide at a temperature in excess of 450° C. whereby salt cake and an equimolar mixture of sulphur dioxide and chlorine are formed, liquefying the mixture, separating the sulphur dioxide and chlorine by fractionally distilling the liquid at one pressure to obtain a residue rich in sulphur dioxide and a distillate of azeotropic mixture of chlorine and sulphur dioxide and then distilling this distillate fractionally at a higher pressure to obtain a residue rich in chlorine and a second azeotropic distillate and returning this second distillate to the first distillation.

HARRISON C. CARLSON.